July 17, 1962 G. O. MAYER ET AL 3,044,886
SLICED SAUSAGE PACKAGE
Filed July 15, 1959
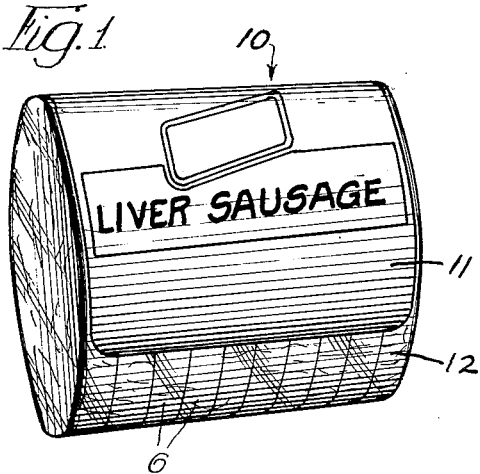
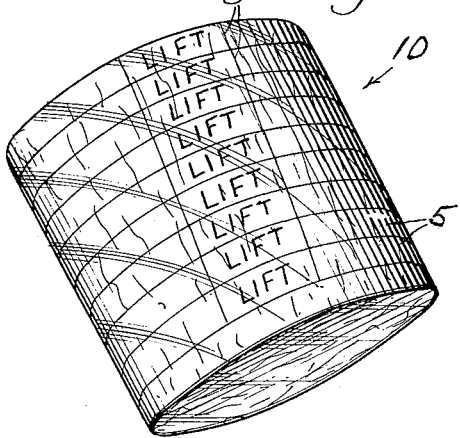
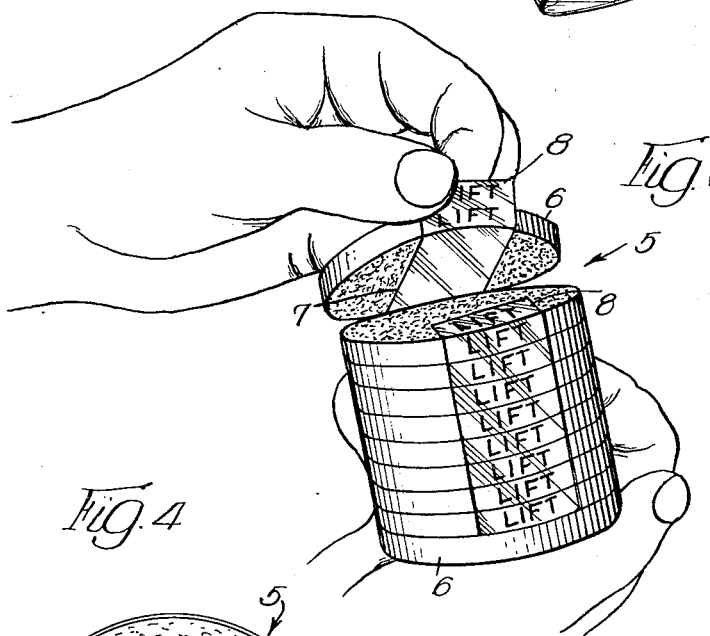
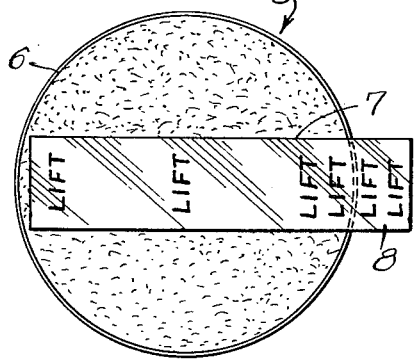
Inventors
Gottfried O. Mayer,
Oscar E. Seiferth,
BY

United States Patent Office 3,044,886
Patented July 17, 1962

3,044,886
SLICED SAUSAGE PACKAGE
Gottfried O. Mayer and Oscar E. Seiferth, Madison, Wis., assignors to Oscar Mayer & Co., Inc., Chicago, Ill., a corporation of Illinois
Filed July 15, 1959, Ser. No. 827,280
2 Claims. (Cl. 99—174)

This invention relates to innovations and improvements in packaging and merchandising a sausage product, such as, liver sausage, in sliced form.

Heretofore, in the merchandising of sausage products, it has been customary to take a bulk sausage stick and sub-divide it into small individual units weighing from eight ounces to two pounds each. These units are then individually wrapped in a suitable film, such as cellophane, polyethylene, Saran, etc. and then sold out of refrigerated self-service meat cases. The housewife, in using sausage in this form, must unwrap the product and slice it for sandwich making or serving. It is well known that the slicing of sausage, e.g. liver sausage, in such form is a difficult task since the outside casing of the sausage is usually made of a tough film or casing and unless great care is exercised and the knife is real sharp, the chunks cannot be sliced evenly leaving a strip of casing material around the periphery. In fact, if the sausage is quite soft, such as liver sausage normally is, the housewife may very well have to resort to scooping or gouging it out of the casing and then use it as a spread. This prevents the sausage from being used on a serving tray and makes it difficult to prepare sandwiches, etc.

On the other hand, by using the slicing machines such as the sausage manufacturer has available, it is not at all difficult to uniformly and evenly slice a relatively soft sausage product, such as liver sausage. However, there then arises the problem of packaging the sliced product not only in neat attractive packages but also in such a way that the slices do not become dried out and yet may be readily separated one from another when the package is opened. Thus, it would be possible to slice a bulk sausage product such as liver sausage and then interleave the slices with square pieces of film or paper which would fully separate each slice from the other. However, such a package would be defective and objectionable in at least two respects. First, it would be very difficult to form an attractive package due to the projection of the four corners of each square of separator film or paper. These corners would not fold down evenly and it would be difficult to wrap the product into a neat attractive package, especially if a transparent film was used as the wrapper through which all irregularity could be viewed. Furthermore, with each slice fully separated from the adjacent slice there would no longer be in effect a chunk of sausage which tends to retain its full and natural moisture for a substantial period of time. Rather, each piece would, in effect, be individually wrapped and there would be a greater tendency to dry out.

It was discovered in accordance with the present invention that a series of slices of liver sausage or the like could be assembled together by stacking with relatively narrow separator strips therebetween, into a package resembling a chunk of the sausage. However, since the leaves in the form of strips of paper or film covering only the center portion of each slice leave a substantial portion of the area of each slice uncovered, the adjacent slices can closely cohere in a separable manner so as to prevent drying out. The separator strips are made long enough so that they project slightly on one end so as to provide a tab which can be folded down smoothly for packaging but which can be used as a lift tab for separating one slice from another when the package is opened.

Accordingly, the object of the invention, generally stated, is the provision of new and improved wrapped packages of sausage, e.g. liver sausage, closely resembling wrapped chunks or units of whole liver sausage but being formed of a stack of uniformly shaped slices each of which is partially separated from the other by means of a strip of paper or film which covers only the central portion of each slice with a projecting tab which may be folded down smoothly at the side of the stack and which may be used for lifting and separating one slice from the other when the package is opened. Preferably, all of the strips are oriented so that the tabs are also oriented and form a band extending down one side of stack.

Other objects of the invention will, in part, be obvious and will in part appear hereinafter.

For a more complete understanding of the nature and scope of the invention reference may now be had to the following detailed description taken thereof in connection with the accompanying drawings, wherein:

FIG. 1 is an elevational view of a package of sliced liver sausage constituting one embodiment of this invention, taken on the side having the label;

FIG. 2 is a perspective view showing the back side of the package of sliced liver sausage shown in FIG. 1;

FIG. 3 is a perspective view showing the package of FIGS. 1 and 2 unwrapped and with one of the slices being lifted by use of the tab thereunder; and FIG. 4 is a top plan view of a slice of liver sausage with the lifting strip resting thereon and with the tab end projecting over one edge of the slice.

In preparing packages of liver sausage or similar sausage materials in accordance with the present invention, whole liver sausage sticks are sliced uniformly by use of automatic slicing machines of known type. Usually such liver sausage will be encased in a relatively tough artificial or natural casing, a band of which is left intact on each of the slices. Because of the toughness of the casing and the softness of the sausage, it is difficult for one to slice this type of sausage by hand as mentioned above. However, this slicing may be rapidly performed on a slicing machine and in a very uniform and neat manner.

A typical slice of liver sausage is illustrated in FIG. 4, being indicated generlaly at 5, having the skin or casing 6 remaining intact thereon. A divider or separating strip 7 is laid over the slice 5 and like strips are laid over each of the other slices. Preferably each strip 7 is placed on one of the slices 5 as shown in FIG. 4 so that one end of the strip does not quite extend to the margin of the slice while the opposite end projects a distance sufficient to form a lifting tab 8. For example, this tab may be approximately one-quarter to one-half an inch long, although this may vary as desired.

The separator, divider or lifting strips 7 may be formed of any inexpensive, flexible non-toxic materials. For example, certain grades of paper such as parchment type paper, non-woven fabric, and certain types of film such as cellophane, Saran, polyethylene, etc. may be used. Desirably, the paper strips may be repeatedly printed with the word "Lift" so as to indicate to the user the manner in which the package is to be handled on opening.

As pointed out above, it is desired that the strip 7 be relatively narrow and not cover most of the slice of sausage for several reasons. One reason is that it is desired that the slices be permitted to come in contact with each other at least for the greater part of their circumference, thereby tending to keep the package of sliced sausage in approximately the same condition as if it had not been sliced. Otherwise, if the slices are completely separated there will be a tendency for the slices to dry out and for the air to reach substantial portions of the surfaces. On the other hand, if the paper or divider strip is kept away from the peripheries of the slices for most of the circumference, then the adjacent slices can cohere together adjacent the margins and form good seals which tend to exclude the air from between the slices. In this connection, it will be seen from FIG. 4 that the strip 7 actually overlies only that portion of the periphery where it projects over the slice. Typically, the slice 5 may have a diameter of approximately three inches while the strip 7 has a width of one inch. In this case the strip 7 would cover approximately 42% of the surface area of the slice 5 while it would overlie only approximately 11% of the circumference thereof. These relationships are not highly critical, and other relationships of the same general order would be acceptable. In general, the divider strips should cover from about 30 to 50% of the surface area and should overlie from 5 to 25% of the periphery.

The slices 5 having been formed, the divider or separator strips 7 may be automatically fed from any suitable strip feeding machine of the general type used for example for feeding tape for various purposes. Such machines are commercially available and can be set to automatically feed strips of tape or the like from spools thereof, in any desired pre-determined lengths. The divider strips may be placed manually on each of the slices and then the slices may be manually stacked with the divider strips oriented. Any suitable number of slices may be stacked depending upon the sizes of the packages desired. Thus a range of weights may be secured simply by making smaller or larger stacks. Once the stacks are formed the tabs 8 are all turned down in the same direction along one side of the stack, this being readily done and because of the relative narrowness of the tabs they will readily conform to the contour of the stack without appreciable wrinkling or pleating. Each stack is then wrapped with a suitable label inserted or otherwise carried. The stacking and wrapping may be carried out manually in a rapid manner or if desired it may be performed on machines.

A finished package is indicated generally at 10 in FIGS. 1 and 2. In FIG. 10 a typical label is shown at 11, being on the inside of a transparent film or wrapper indicated at 12. In FIG. 2 the rear side of the package 10 shown in FIG. 1 is illustrated and it shows each of the lifting tabs 8 being turned down in substantial alignment with the other tabs.

The manner in which the lifting tabs are used is illustrated in FIG. 3. After the wrapper 12 has been completely or partly removed, then each tab 8 may be grasped between the thumb and forefinger and lifted upwardly, thereby separating the superposed or upper slice 5 from the balance of the stack. After one or more slices have been removed as desired, the wrapper may be replaced by hand and then reopened when more slices are to be removed.

While the adjacent surfaces or opposed surfaces of a sausage product such as liver sausage, which is relatively soft, will readily conform and cohere to each other with the fat and moisture present at the surface assisting the cohesion, each of the slices 5 may be readily separated intact without the divider strip 7 being torn.

Accordingly, the packages 10 have all the advantages of, and substantially the same appearance as, a regular package of an unsliced chunk of sausage. However, by being pre-sliced, the new product may be readily utilized either for serving or sandwich preparation, and very conveniently with a minimum of effort. In fact, it is only necessary to open the wrapper, lift up the desired number of slices, remove the divider strips, and that is all.

While the invention has been described and illustrated primarily in connection with liver sausage, it will be understood that it has utility with other sausages having similar characteristics.

Having described the invention and having illustrated a preferred embodiment thereof and mentioned other preferred embodiments, it is to be understood that the foregoing description is intended to be interpreted as illustrative and not in a limiting sense.

We claim:

1. A package of a food product of the liver sausage type which is characterized by being relatively soft and having a tendency to dry out when divided into slices and the surfaces of the slices tending to adhere when stacked, said package being in the form of a plurality of relatively thin slices of the product arranged in superimposed stacked relation with the slices being approximately the same size and shape, a divider strip between each two adjacent slices, said divider strip being formed of relatively thin flexible non-toxic sheet material, said divider strip having a width substantially less than the corresponding dimension of the slices and a length sufficient for one end thereof to extend beyond the periphery of the slices when the strip is positioned with the other end thereof interposed between said adjacent slices so that only the middle portions of said adjacent slices are covered by the strip and uncovered portions thereof on either side of the strip are in releasable cohering engagement so as to prevent air from reaching substantial portions of the contiguous surfaces of adjacent slices and to reduce the tendency of the slices to dry out, the extended end of each strip being folded upwardly against the periphery of the uppermost slice so that it may be grasped to separate said slice from the adjacent slice beneath the same when the package is opened, the extended ends of said strips being aligned on one side of the package so as to have the appearance of a continuous strip on the side of the stack, and a wrapper formed from a transparent film material enclosing the stack as though it were a solid chunk of the product.

2. The package called for in claim 1 wherein each of said divider strips covers from about 30 to 50% of the surfaces area of each adjacent slice and overlies from about 5 to 25% of the periphery of each adjacent slice.

References Cited in the file of this patent

UNITED STATES PATENTS

| | | |
|---|---|---|
| 1,811,772 | Willoughby | June 23, 1931 |
| 1,838,000 | Rumsey | Dec. 22, 1931 |
| 2,379,934 | Seiferth | July 10, 1945 |
| 2,635,965 | Hensgen et al. | Apr. 21, 1953 |